United States Patent [19]

Burrus

[11] 4,167,749

[45] Sep. 11, 1979

[54] NOISE REDUCTION APPARATUS

[75] Inventor: Thomas W. Burrus, Indianapolis, Ind.

[73] Assignee: RCA Corporation, New York, N.Y.

[21] Appl. No.: 801,001

[22] Filed: May 26, 1977

[51] Int. Cl.² .................. H04N 5/14; H04N 5/78; H04N 9/535

[52] U.S. Cl. .................................. 358/8; 358/36; 358/167

[58] Field of Search .................. 358/8, 36, 39, 167, 358/904, 166, 37; 325/473, 477; 334/14; 328/168, 169, 164, 167

[56] References Cited

U.S. PATENT DOCUMENTS

| | | | |
|---|---|---|---|
| 3,602,737 | 8/1971 | Radecke | 358/167 X |
| 3,715,477 | 2/1973 | Olson et al. | 358/36 |
| 3,872,387 | 3/1975 | Banach | 358/904 X |
| 3,971,064 | 7/1976 | Milbourn | 358/904 X |
| 4,009,334 | 2/1977 | Sypula | 358/36 X |
| 4,031,547 | 6/1977 | Saiki et al. | 358/167 |
| 4,074,321 | 2/1978 | Miller | 358/904 X |

Primary Examiner—Robert L. Griffin
Assistant Examiner—Aristotelis M. Psitos
Attorney, Agent, or Firm—E. M. Whitacre; J. S. Tripoli; J. E. Roehling

[57] ABSTRACT

In a system where improvement of the signal-to-noise ratio for a wideband video signal is effected by subtraction therefrom of a signal which follows low-amplitude excursions, within selected close-to-axis limits, of the video signal's high frequency component, means are provided for varying the selected close-to-axis limits in response to variations in the level of noise accompanying the video signal. In an illustrative use, the noise reduction apparatus is advantageously employed to process a luminance signal component separated by the comb filtering from a composite signal recovered during playback of a video disc, with the limits varying means being responsive to variations in the level of noise accompanying the luminance signal components. The subtraction step is effected in apparatus also serving to recombine separated luminance and chrominance components for formation of the disc player's output composite signal.

7 Claims, 4 Drawing Figures

NOISE REDUCTION APPARATUS

The present invention relates generally to noise reduction apparatus, and particularly to noise reduction apparatus of a form advantageous for use in the improvement of the signal-to-noise ratio of signals developed by video disc players.

It has been proposed in the prior art (e.g., British Pat. No. 685,483) to effect signal-to-noise improvement for a video signal by subjecting the high frequency portion of the signal to the action of a network having a non-linear transfer characteristic of a type providing substantially zero response to signal excursions in the immediate vicinity of the zero axis of the high frequency signal portion. The network action may be viewed as "coring" the high frequency signal, i.e., removing from the signal the close-to-axis core thereof. With suitable restriction of the limits of the region of substantially zero response, small amplitude excursions about the zero axis may be eliminated without intolerable distortion of larger amplitude excursions. As a result, background noise components may be eliminated or significantly reduced in amplitude with little disturbance of desired high frequency components of the video signal.

In one convenient approach to application of the above-described coring principles to video signal noise reduction (shown, for example, in U.S. Pat. No. 3,602,737), the high frequency portion of a wideband video signal is selectively passed by a high pass filter to the input of an amplitude limiter which eliminates signal excursions beyond selected close-to-axis limits, and the limiter output is subtractively combined with the wideband video signal to effect the desired "coring" via component cancellation.

In another convenient approach to application of the above-described coring principles to video signal noise reduction (e.g., copending U.S. application Ser. No. 718,804 filed Aug. 30, 1976 now U.S. Pat. No. 4,110,784, for T. W. Burrus, et al.) the aforesaid cancellation approach to noise reduction in video signal systems is advantageously realized by apparatus wherein the limiter function is achieved by an amplifier provided with a negative feedback path incorporating threshold devices which activate the negative feedback path only during signal excursions beyond selected close-to-axis limits. The amplifier output, effectively limited to signal excursions within the selected limits, is supplied to an attenuator which reduces the amplified signal excursions to a level suitable for effecting the desired cancellation of low level components of the wideband video signal.

In accordance with the principles of the present invention, the loss of signal information attendant the above-described coring approach to signal processing, which in the aforementioned prior art is constant irrespective of the accompanying noise level, is advantageously reduced during intervals where the accompanying noise level is low by a proportional reduction in the magnitude of the signal core removed. Moreover, during intervals where the noise level, accompanying the signal to be processed, is high, the improvement in signal-to-noise ratio is still realized through an increase in the magnitude of the signal core removed.

In further accordance with the principles of the present invention, the above-described coring approach to signal processing advantageously includes means for continuously adjusting the coring level (i.e., the selected close-to-axis limits) in response to variations in the level of noise accompanying the signal to be processed. With loss of signal information attendant the coring process being reduced during intervals where the noise level is low by a corresponding reduction in the coring level, and with the improvement in signal-to-noise ratio still being realizable during intervals where the noise level is high by a corresponding increase in the coring level, an increase in the efficiency of the coring process is achieved.

Pursuant to one aspect of the present invention, means are provided for sensing the level of noise accompanying the signal to be processed and for developing a control voltage in response to the sensed noise level. This control voltage may be utilized to control the operation of a coring circuit to effect the above-mentioned adjustable coring of the signals.

Pursuant to another aspect of the present invention, the level of accompanying noise is desirably sensed at the output of the coring circuit to advantageously provide a closed loop feedback control of the coring circuit operation.

The principles of the present invention will be described, for purposes of illustration only, with reference to the cancellation approach to coring explained in the above-mentioned Burrus, et al. application. It will be realized, however, that those principles are also applicable to use with other forms of coring systems.

In an illustrative use, the noise reduction apparatus of the present invention is advantageously employed in a video disc player to modify a luminance signal component separated by comb filtering action from a composite color video signal of a so-called "buried subcarrier" form (as described, for example, in U.S. Pat. No. 3,872,498—Pritchard).

Figure 1:
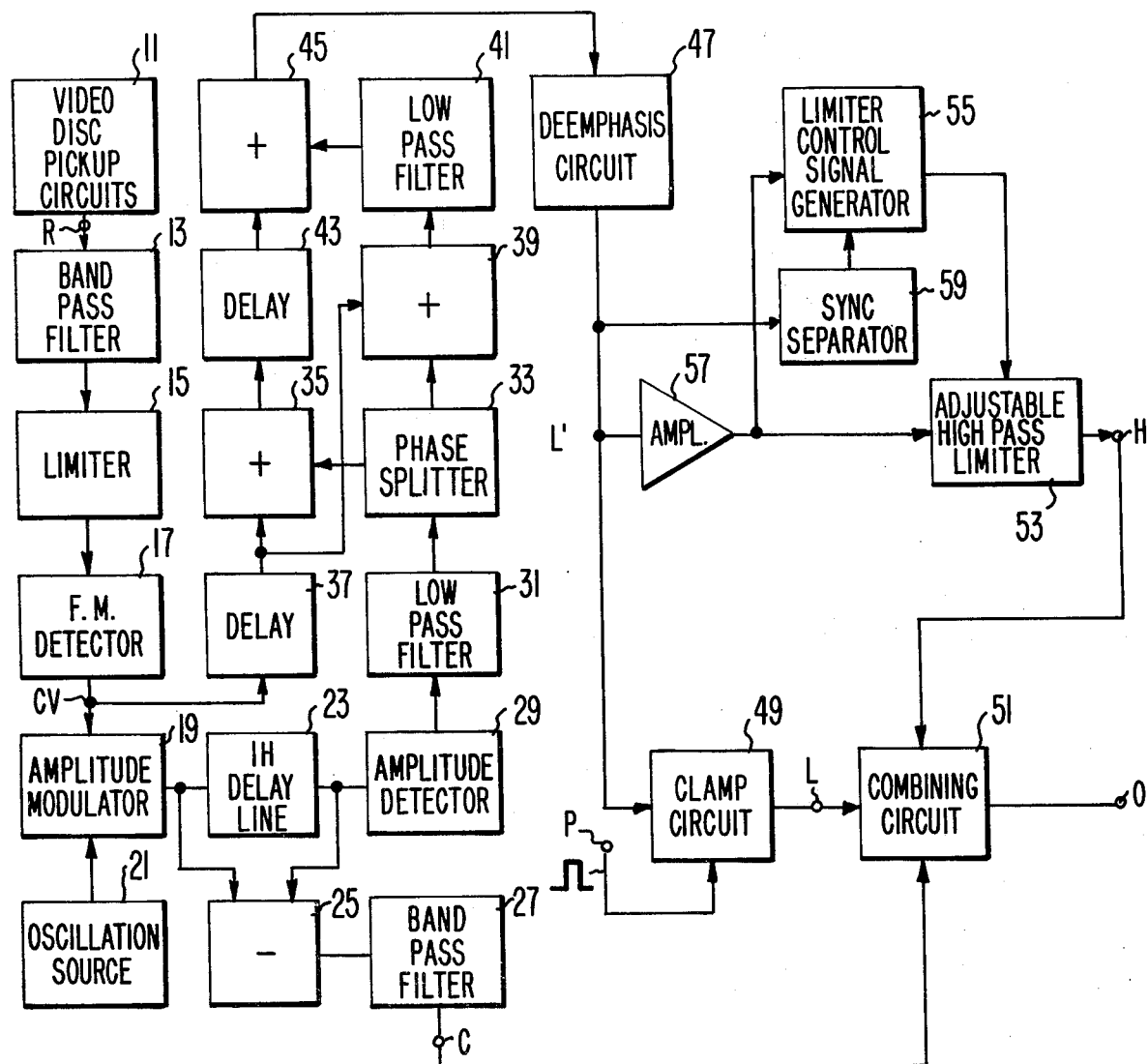
FIG. 1 illustrates, in block diagram form, video disc player apparatus incorporating an adjustable coring circuit in accordance with an embodiment of the present invention.

As illustrated in FIG. 1, a video disc player includes video disc pickup circuits 11 (which may, for example, be of the general type shown in U.S. Pat. No. 3,842,194 Clemens) for developing an output at terminal R which is representative of signals recorded on a video disc. Illustratively, the recorded signals are of the type described in U.S. Pat. No. 3,969,756—Clemens, et al; and include picture carrier waves modulated in frequency in accordance with the amplitude of composite color video signals.

A bandpass filter 13, coupled to terminal R and having a passband encompassing the picture carrier deviation range and significant sidebands thereof, selectively passes the frequency modulated picture carrier waves to a limiter 15, which serves to remove spurious amplitude modulation of the picture carrier waves. The limiter output is applied to a frequency modulation detector 17, which recovers the modulating information, developing composite color video signals at the detector output terminal CV. Pursuant to the illustrative recording signal parameters of the aforementioned U.S. Pat. No. 3,969,756, the recovered composite signals include a luminance signal component occupying a 0-3 MHz. band of frequencies, and a chrominance signal component falling in a midband portion (1-2 MHz.) of the luminance band. The chrominance signal comprises modulated color subcarrier waves, with the subcarrier frequency corresponding to an odd multiple of half the line frequency (e.g., 195 times $f_H/2$, or approximately 1.53 MHz.), and with the subcarrier sideband components falling within regularly spaced segments of said midband (interleaved with midband components of the luminance signal).

Where the output of the video disc player is to be applied to a conventional color television receiver, it is desirable to effect transcoding of the composite signal from the "buried subcarrier" format in which it appears at terminal CV to a format compatible with the composite signal processing circuitry of the color television receiver (e.g., to an NTSC-like format, wherein the color subcarrier lies at 455 $f_H/2$, or approximately 3.58 MHz.). In the illustrative player arrangement of the drawing, such transcoding is effected by circuitry disposed in a configuration generally described in U.S. Pat. No. 3,969,757—Amery.

For the aforesaid transcoding purposes, the signal appearing at terminal CV is supplied, as a modulating signal input, to an amplitude modulator 19, also receiving a carrier wave input supplied by an oscillation source 21. The frequency of the carrier waves supplied by source 21 desirably corresponds to the sum of the buried subcarrier frequency of the recovered composite signals and the desired output subcarrier frequency (e.g., such sum corresponding to 0.325 $f_H$, or approximately 5.11 MHz.) so that the color subcarrier falls at the desired output subcarrier frequency in the lower sideband of the modulated carrier wave output of modulator 19. However, where time base errors engendered in the playback operation cause the recovered subcarrier frequency to depart from its intended buried subcarrier value, it is desirable that the frequency of the carrier waves supplied by source 21 follows such departures so as to maintain the subcarrier frequency in the lower sideband of the modulator output at the desired output subcarrier frequency. For such output frequency stabilization purposes, the oscillation source 21 desirably takes the form of a voltage controlled crystal oscillator controlled by suitable phase locked loop circuitry, as shown, for example, in the aforementioned U.S. Pat. No. 3,969,757.

The output of modulator 19 is applied to the input of a 1H delay line 23, having a passband of sufficient width to encompass the frequencies of the carrier wave and its lower sideband. The signals at the input and the output of delay line 23 are applied to a subtractive combiner 25. The combination of elements 23 and 25 forms a comb filter of a form exhibiting regularly spaced rejection notches recurring at even multiples of half the line frequency, with interleaved pass bands centered about odd multiples of half the line frequency. The combiner output is applied to a bandpass filter 27, having a passband restricted to the frequency band (e.g., 3.08–4.08 MHz.) occupied by the sidebands of the frequency translated color subcarrier. The output of bandpass filter 27, appearing at terminal C, comprises a chrominance signal, freed from accompaniment by luminance signal components and occupying a frequency band location desired for compatibility with television receiver signal processing circuitry.

The output of delay line 23 is applied to an amplitude detector 29, which effects demodulation of the modulated carrier waves it receives. The detector output is supplied to a lowpass filter 31, having a cutoff frequency corresponding to the highest frequency (e.g., 3 MHz.) of the recovered composite signals. The output of lowpass filter 31 thus corresponds to a delayed version of the composite signals appearing at terminal CV. The signals appearing at terminal CV are applied to a delay device 37, which imparts a delay of a magnitude substantially corresponding to the delay introduced by lowpass filter 31, whereby the difference in delay of the respective outputs of elements 31 and 37 corresponds to the line interval delay introduced by the 1H delay line 23.

The output of lowpass filter 31 is delivered to a phase splitter 33, which provides versions of the delayed composite signal of mutually opposed phasing as respective outputs. One of the outputs of phase splitter 33 is additively combined with the output of delay device 37, while the other of the outputs of phase splitter 33 is additively combined with the output of delay device 37 in adder 39. The poling of the phase splitter output supplied to adder 35 is such that the signal addition therein produces the effect of a comb filter of the type having regularly spaced rejection notches falling at odd multiples of half the line frequency, with interleaved pass bands centered about even multiples of half the line frequency. The output of adder 35 thus includes luminance signal components, substantially freed from accompaniment by buried subcarrier sideband components. However, the combing action extends below the shared midband, and thus eliminates luminance components in an unshared lowband (e.g., 0–1 MHz.) including components desired for retention for adequate vertical detail rendition in reproduced images.

The opposite poling of the phase splitter output delivered to adder 39, however, is such that its additive combination with the output of a delay device 37 results in a comb filtering action of a type complementary to that provided by adder 35, whereby components eliminated in the output of adder 35 are present in the output of adder 39. The output of adder 39 is applied to a lowpass filter 41 having a cutoff frequency below the lowest buried subcarrier sideband component frequency, with an illustrative choice permitting passage of a vertical detail signal in a band of approximately 0–500 KHz while blocking passage of the buried subcarrier chrominance component.

The output of lowpass filter 41 is applied to an adder 45 for additive combination with the output of adder 35. A delay device 43 is interposed in the coupling of the adder 35 output to an input of adder 45, with the signal delay introduced thereby chosen to substantially match the delay introduced by lowpass filter 41.

The output of adder 45 comprises a luminance signal with restored vertical detail information, with the adding of the complementary comb filter outputs effectively providing a "filling in" of the luminance component combing over a lowband determined by the passband of filter 41 (in the manner discussed, for example, in U.S. Pat. No. 2,729,698, issued to G. Fredendall). The output of adder 45 is supplied to a de-emphasis circuit 47 which provides a de-emphasis of luminance component high frequencies in a manner suitably complementary to the pre-emphasis thereof employed in the disc recording operation.

The output of de-emphasis circuit 47 is applied to a clamp circuit 49, which serves to restore the DC component of the luminance signal. Reference may be made to the copending U.S. Patent application of A. Baker, Serial No. 590,485 now U.S. Pat. No. 4,057,826 for a description of suitable apparatus for developing keying pulses, applied at terminal P, in response to the deflection synchronizing components of the recovered luminance signal.

The clamped output of circuit 49, appearing at terminal L, forms a wideband luminance component input for a signal combining circuit 51, which combines such input with the frequency translated chrominance signal component from the filter output terminal C to form an output composite signal (at the combiner output terminal O) of a form suitable for application to a conventional color television receiver. Where such application is to be to the receiver's antenna terminals, the signal at terminal O may serve as the composite video signal input to transmitter apparatus, of a form, for example, as shown in U.S. Pat. No. 3,775,555—Carlson. Details of circuits 49 and 51 are described in the aforementioned Burrus, et al. application.

In addition to serving the aforementioned function of combining luminance and chrominance signals for output composite signal formation, the combining circuit 51 also serves in implementation of the noise reduction principles of the present invention by selectively effecting cancellation of low-amplitude high frequency components of the signal input from terminal L by subtractively combining that signal with an additional signal derived from the output terminal H of an adjustable high pass limiter apparatus 53. This additional signal contains the same low-amplitude high frequency components as the signal input from terminal L. A combination of the signal inputs from terminals L and C, minus those low-amplitude, high frequency components of the signal input from terminal L which have been effectively cancelled by the signal input from terminal H, appears at the combining circuit output terminal O.

Adjustable high pass limiter 53 provides, at terminal H, an output signal which follows low-amplitude excursions, within selected close-to-axis limits, of the output of de-emphasis circuit 47. The selected close-to-axis limits are subject to variation in response to a control signal provided by a limiter control signal generator 55 which senses the level of noise accompanying the output of de-emphasis circuit 47 after its amplification in input amplifier stage 57. The output of synchronization information (sync) separator circuit 59 is helpful in enabling generator 55 to sense the accompanying noise during intervals where no image information appears.

Figure 2:
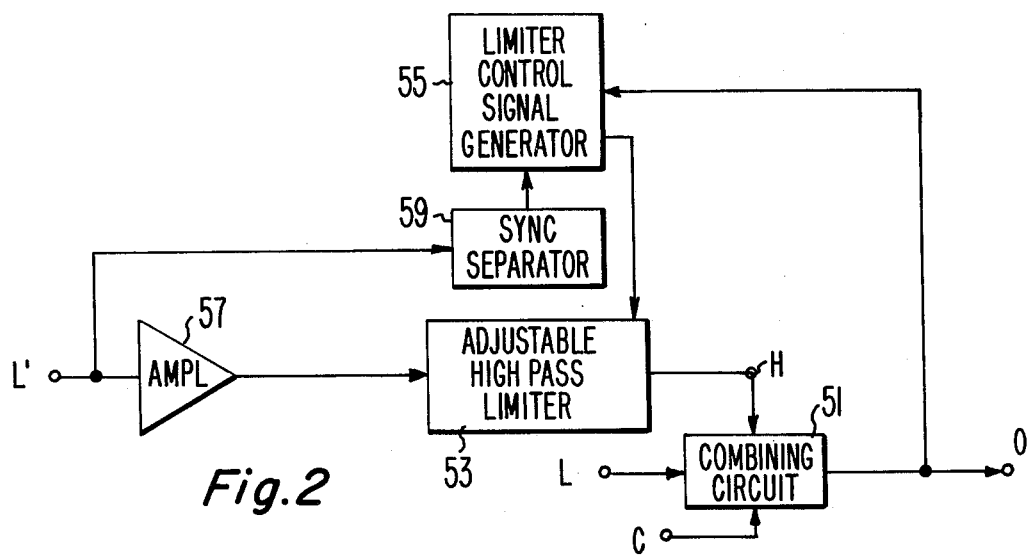
FIG. 2 illustrates, in block diagram form, an arrangement for noise level sensing at the output of an amplitude limiter, which arrangement may be incorporated in the circuit of FIG. 1.

FIG. 2 illustrates a modification of the FIG. 1 arrangement in accordance with a second embodiment of the present invention which utilizes sensing of the residual noise present in the resultant of the coring operation. Pursuant to the modification, the limiter control signal generator 55 is rendered responsive to the cored output of combining circuit 51 (rather than the uncored output of amplifier 57 relied upon in FIG. 1). This arrangement advantageously provides a feedback control over the coring operation, which opposes increases in the output noise level above a tolerable magnitude.

Figure 3:
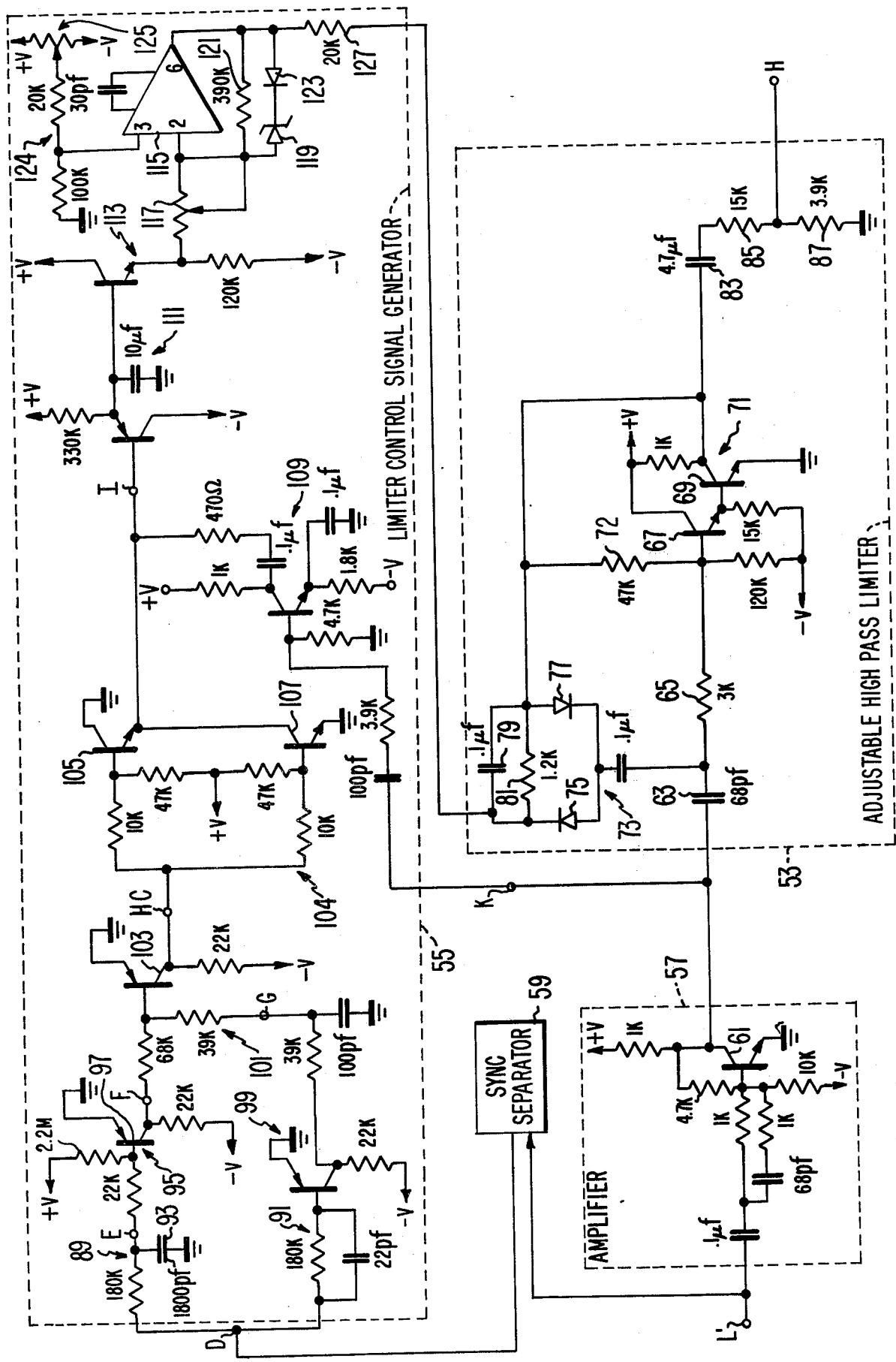
FIG. 3 illustrates, in schematic diagram form, an adjustable high pass limiter and a limiter control signal generator included in the circuit of FIG. 1.

FIG. 3 schematically illustrates the circuit arrangement of the adjustable high pass limiter apparatus 53, the input amplifying stage 57 and the limiter control signal generator 55 of the FIG. 1 configuration. The input amplifying stage 57 employs a grounded-emitter transistor 61 to effect amplification and phase inversion of the signal output of de-emphasis circuit 47. In limiter 53, the output of the amplifying stage 57 is coupled, through a network including a capacitor 53 in series with a resistor 65, to the base of an emitter-follower transistor 67. The emitter-follower transistor 67 in cascade with a grounded-emitter transistor 69, forms a phase inverting, output amplifying stage 71. Feedback via resistor 72, coupled between the collector of transistor 69 and the base of transistor 67, ensures that the output amplifying stage 71 presents a low input impedance to its signal input.

Capacitor 63 and resistor 65 form a differentiator, which effects a high pass filtering of the signal output of the input amplifying stage 57, so that significant input current variations in transistor 67 occur only in response to high frequency components of the signal output of de-emphasis circuit 47 after its amplification in stage 57.

An amplitude limiting action is provided for the output amplifying stage 71 by an additional feedback network which is coupled between the collector of output transistor 69 and the junction of the differentiator elements 63, 65. The feedback network includes a blocking capacitor 73 in series with a pair of diodes 75, 77. The diodes 75, 77 are connected so as to be oppositely poled in the feedback path with the anode of diode 77 being respectively coupled to the collector of transistor 69 and, through the parallel combination of a capacitor 79 and resistor 81, to the cathode of diode 75. Capacitor 79 and resistor 81 form a network across which a voltage is developed which biases the respective diodes 75 and 77 in the forward direction. This bias voltage is subject to variation, to control the conduction thresholds of diodes 75 and 77, in accordance with the output of the limiter control signal generator 55, as will be explained hereinafter in more detail.

Assuming given conduction threshold levels for the diodes 75, 77, when the amplitude excursions of the high frequency components of the input signal to transistor 67 are sufficiently small, the diodes 75, 77 remain in nonconducting states and the additional feedback network is not activated. In this mode of operation, the input signal excursions are amplified by the output amplifying stage 71 with a gain primarily determined by the ratio of the resistance values of resistors 72 and 65.

When an input component amplitude excursion in a first direction reaches a first threshold level, the resultant swing at the collector of transistor 69 is sufficient to forward bias one of the pair of diodes to activate the additional feedback network. Likewise, when an input component amplitude excursion in the opposite direction reaches a second threshold level, the resultant swing at the collector of transistor 69 is sufficient to forward bias the other of the pair of diodes to activate the additional feedback network. Input component amplitude exursions beyond either of the aforesaid threshold levels are not followed at the collector of output transistor 69 because of the activated state of the additional feedback network.

The collector of transistor 69 is coupled by a blocking capacitor 83 to an attenuator formed by the series combination of resistors 85 and 97. The attenuator output appears at the limiter output terminal H, coupled to the junction of resistors 85 and 87.

In the described video disc player apparatus of the drawing of FIG. 1, the desired composite video signals which appear at the output terminal CV of the FM detector 17 are accompanied by undesired noise components. While such noise components are present throughout the wideband spectrum of the desired signal, there is a tendency for the amplitude of the noise components at the high frequency end of the signal spectrum to be greater than the amplitude of the noise components at the low frequency end of the signal spectrum. While the operation of de-emphasis circuit 47 contributes a reduction in the amplitude of the high frequency noise components which accompany the wideband luminance signal components at the terminal L input to combining circuit 51, the amplitude of the residual high frequency noise components at terminal L may still be sufficient to impose a visibly noisy background on pictures displayed in response to the accompanying luminance signal. However, the "coring" action provided by the cancelling effect of the limited signal applied from terminal H to combining circuit 51 serves to eliminate, or sufficiently attenuate, such residual high frequency noise components in normal playback circumstances, as to ensure a reasonably quiet background in pictures displayed in response to the output signal of the combining circuit 51.

This result can be advantageously attained with limiter threshold levels suitably set so that signal removal is restricted to a very small percentage (e.g., less than 1%) of the maximum peak-to-peak swing of the luminance signal during intervals where the accompanying noise level is low, whereby fast, large amplitude video signal transitions suffer only a slight loss of amplitude through the coring action. Conversely, during intervals where the accompanying noise level is high, the limiter threshold level may be suitably altered so that signal removal of a larger percentage (e.g., 3%) of the maximum peak-to-peak swing of the luminance signal is effected to ensure a reasonably quiet background in pictures displayed in response to the output signal of the combining circuit 51 despite the noise level elevation in the input signal.

Through suitable choice of circuit parameters, the amount of amplification to which the luminance signal is subjected to in the output amplifying stage 71 is selected such that, with a minimum forward bias across the diodes 75, 77, conduction thresholds of the respective diodes are separated by a value substantially corresponding to 3.5% of the largest peak-to-peak swing of the signal developed at terminal L'. An increase in the forward bias applied across diodes 75, 77 due to a decrease in the output of limiter control signal generator 55, leads to a reduction in the respective conduction thresholds of both diodes and therefore the signals appearing at terminal H will be correspondingly further limited in amplitude with the consequence of a reduction in the coring operation effected in combining circuit 51.

Figure 4:
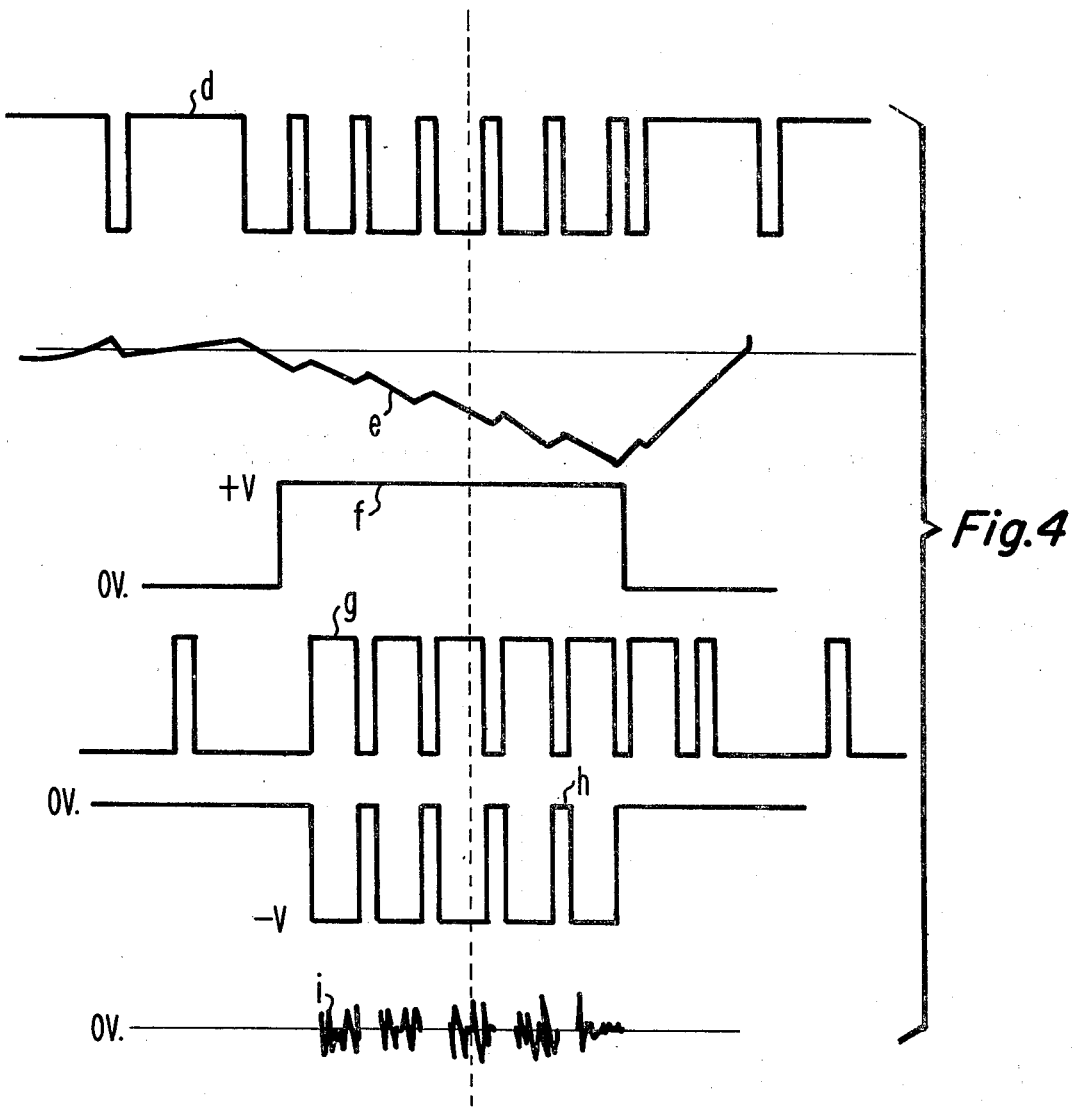
FIGS. 4D, 4E, 4F, 4G, 4H and 4I are curves in the time domain representing typical signals at correspondingly lettered points of FIGS. 1 and 3.

It will be instructive at this point to turn to a description of the limiter control signal generator 55 and the operation thereof. With reference to FIG. 3, the video signal at terminal L' is applied to a sync separator circuit 59. The output of the sync separator 59, developed at terminal D (shown in waveform d in FIG. 4), is simultaneously applied to an integrator 89 and a delay line 91 both of which are comprised within limiter control signal generator 55. Capacitor 93, in integrator 89, acts as a shunt for the high frequency component of the sync separator output (i.e., the horizontal sync signal), while the low frequency component of the sync separator i.e., the vertical sync signal) is integrated. The output of integrator 89 (shown in waveform e in FIG. 4) is applied to a pulse shaper network 95 comprising a transistor 97 which is biased to conduct for the duration of the negative ramp of the integrated vertical sync signal. The output of pulse shaper 95 (shown in waveform f in FIG. 4) and the delayed and inverted composite sync signal (shown in waveform g in FIG. 4) developed by delay line 91 and an inverter 99, are applied to respective input terminals F, G, of a gate 101. The output of gate 101 (shown in waveform h in FIG. 4), developed at the collector of a transistor 103 (terminal HC) upon the coincident application to terminals F, G of signals substantially at ground potential, comprises a series of negative pulse. As shown in waveform h in FIG. 4, these pulses correspond to portions of the vertical synchronization intervals during which the desired signal level is at a reference video level. These pulses are applied, through a biasing network, to the respective bases of a collector-grounded transistor 105 and an emitter-grounded transistor 107. The emitter of transistor 105 and the collector of transistor 107 are coupled at terminal I. With a signal appearing at ground potential at terminal HC, at least one of transistors 105, 107 will be biased into saturation and terminal I will be clamped at ground potential. However, where a negative signal is applied to the respective bases, the respective transistors will be biased into cut-off and terminal I will be removed from ground potential clamping.

The luminance signal developed at terminal K is applied, through an isolation stage 109, to terminal I and therefore, in those intervals where the ground potential clamping is removed from terminal I, the signal appearing thereat will correspond to the output of isolation stage 109. Since those intervals are chosen to be coincident with portions of the vertical synchronization intervals, the signal developed at terminal I during those intervals is at the video reference level and departures from that level will correspond to the noise accompanying the luminance signal.

The envelope of the signal developed at terminal I is detected in envelope detector 111 and is amplified in dc amplifier 113 whose output is coupled to a pin 2 of an eight-terminal operational amplifier 115 (e.g., type LM301AN) through a potentiometer 117. The wiper contact of a potentiometer 117 is also respectively connected to both pin 2 of the amplifier 115 and the anode of a zener diode 119 and through a resistor 121, to a pin 6 of the amplifier 115. The cathode terminal of zener diode 119 is connected through a blocking diode 123 to pin 6 of the amplifier 115 while a pin 3 of the amplifier 115 is connected, through a voltage divider 124, to the wiper arm of a second potentiometer 125 coupled to sources of potential.

The ratio of the impedance of resistor 121 to the impedance of potentiometer 117 determines the attenuation of the signal applied at pin 2 of the amplifier 115. This together with the bias voltage developed by potentiometer 125 determines the gain of the signal developed at pin 6 of the amplifier 115. Through appropriate adjustments of respective potentiometers 117, 125, the output developed at pin 6 of the amplifier 115 can be adjusted, for desired gain value within set minimum and maximum limits.

The output of the amplifier 115 which is applied through a resistor 127 to the cathode of diode 75 in limiter 53 to effect the aforementioned forward biasing of the diodes 75, 77, is normally a dc voltage of positive polarity. This dc voltage is at its minimum positive value, effecting a large forward biasing of the diodes 75, 77, at low levels of noise and is at its maximum positive value, effecting a small forward biasing of the diodes 75, 77, for levels of noise equal to or exceeding a given high noise level. For noise levels intermediate the low and the high noise levels, the output voltage at pin 6 is at a positive value effecting a forward biasing of diodes 75, 77, which is inversely proportional to the sensed noise level. As mentioned above these parameters can be selected and varied by proper adjustments of the respective potentiometers 117, 125.

What is claimed is:

1. Signal coring apparatus for use with a source of signals comprising video signals subject to occupancy of a given band of frequencies and undesirably subject to accompaniment by noise, comprising:

means, coupled to said source, for subjecting the signal output of said source to signal component removal over a band of frequencies restricted to a high frequency portion of said given band, and including means for limiting the amplitude of the removed signal components;

means, responsive to the signal output of said source, for developing a control voltage subject to variations in response to variations in the level of noise accompanying said video signals; and means for utilizing said control voltage to control the amplitude limits of said amplitude limiting means such that the output signals subjected to signal component removal by said subjecting means are adjustably cored in response to variations in the level of noise accompanying said video signals, whereby the amplitude limits of said amplitude limiting means are relatively small during intervals where the accompanying noise level is low and are relatively large during intervals where the accompanying noise level is high.

2. Signal coring apparatus in accordance with claim 1 wherein said control voltage developing means is responsive to the signal output of said source after it has been subjected to signal component removal in said signal component removal means.

3. Signal coring apparatus in accordance with claim 1 wherein said control voltage is subject to variations in its amplitude which variations in amplitude is inversely proportional to the variations in the level of noise accompanying said video signals.

4. Signal coring apparatus in accordance with claim 1 wherein said video signals are representative of a color image and wherein said control voltage developing means includes means for deriving the noise accompanying said video signals during one or more recurring interval in which the signal output of said source contains no image information.

5. In a system for playback of a record of successive color images, said system including means for deriving during said record playback a color image representative composite video signal including a luminance signal, a modulated color subcarrier forming a chrominance signal having frequencies interleaved with the frequencies of a portion of said luminance signal, and a sync signal including a low frequency sync component and a high frequency sync component, said system further including means for deriving from said composite video signal a luminance signal subject to occupancy of a given band of frequencies and which is substantially free of said chrominance signal; the combination comprising:

means, coupled to said luminance signal deriving means, for subjecting the output signal of said luminance signal deriving means to signal component removal over a band of frequencies restricted to a high frequency portion of said given band, and including means for limiting the amplitude of the removed signal components;

means, coupled to said luminance signal deriving means, for deriving a sync signal including said low frequency sync component and said high frequency sync component from the output signal of said luminance signal deriving means;

means, coupled to said sync signal deriving means, having an input terminal and an output terminal and providing signal phase inversion between said input and output terminals for integrating the low frequency sync component of the output signal of said sync signal deriving means;

means, coupled to said sync signal deriving means, having an input terminal and an output terminal and providing signal phase inversion between said input and output terminals for delaying the output signal of said sync signal deriving means for a given time interval;

first gate means having two input terminals;

means for applying the output signals of said integrating means and said delaying means to respective input terminals and said first gate means;

second gate means, coupled to said luminance signal deriving means, for passing the output of said luminance signal deriving means when enabled by the output of said first gate means;

means coupled to said second gate means for envelope detecting the output thereof;

means coupled to said envelope detecting means for amplifying the output thereof; and means for utilizing the amplified output of said envelope detecting means to control the operation of said amplitude limiting means.

6. Signal coring apparatus, for use with a source of signals comprising video signals subject to occupancy of a given band of frequencies and undesirably subject to accompaniment by noise, comprising:

means, coupled to said source, for filtering and amplifying the high frequency portion of said given band within certain amplitude limits;

means, responsive to the level of the noise accompanying the signal output of said source, for developing a control voltage subject to variation in response to variations in the level of noise accompanying said video signals; and means for coupling said control voltage to said filtering and amplifying means to control the amplitude limits of the signals passed by said filtering and amplifying means, whereby the limits of said filtering and amplifying means are relatively small during intervals where the accompanying noise level is low and are relatively large during intervals where the accompanying noise level is high; and combining means, responsive to said source of signals and to the output signal from said filtering and amplifying means, for combining the output signal from said signal filtering and amplifying means and the output of said source of signals, whereby said video signals are adjustably cored in response to variations in the level of noise accompanying said video signals.

7. In a system for playback of a record of successive color images, said system including means for deriving during said record playback a color image representative composite video signal including a luminance signal, a modulated color subcarrier forming a chrominance signal having frequencies interleaved with the frequencies of a portion of said luminance signal, and a sync signal having synchronization intervals at a video reference level, said system further including means for deriving from said composite video signal a luminance signal subject to occupancy of a given band of frequencies and which is substantially free of said chrominance signal; the combination comprising:

means, coupled to said luminance signal deriving means, for filtering and amplifying the high frequency portion of said given band within certain amplitude limits;

means, coupled to said luminance signal deriving means, for deriving said sync signal from the output signal of said luminance signal deriving means;

means, coupled to said sync signal deriving means, for clamping the video reference level at a reference potential during synchronization intervals;

means, coupled to said luminance signal deriving means and said reference clamping means, for deriving the level of noise accompanying said luminance signal;

means, coupled to said noise deriving means, for developing a control voltage subject to variation in response to variations in the level of noise accompanying said luminance signal;

means for coupling said control voltage to said filtering and amplifying means for controlling the amplitude limits of said filtering and amplifying means whereby the amplitude limits are relatively small during intervals where the accompanying noise level is low and are relatively large during intervals where the accompanying noise level is high; and combining means, responsive to said luminance signal deriving means and to the output signal from said filtering and amplifying means, for combining the output signal from said signal filtering and amplifying means and said luminace signal, whereby said luminance signal is adjustably cored in response to variations in the level of noise accompanying said video signal.

* * * * *